United States Patent [19]

Liu et al.

[11] Patent Number: 5,150,228
[45] Date of Patent: Sep. 22, 1992

[54] REAL-TIME EDGE-ENHANCED OPTICAL CORRELATOR

[75] Inventors: Tsuen-Hsi Liu, Northridge; Li-Jen Cheng, La Crescenta, both of Calif.

[73] Assignee: The United States of America as represented by the Administrator of the National Aeronautics and Space Administration, Washington, D.C.

[21] Appl. No.: 797,569

[22] Filed: Nov. 25, 1991

[51] Int. Cl.[5] .......................... G03B 1/16; G02B 27/42
[52] U.S. Cl. ........................................ 359/7; 359/559; 359/561
[58] Field of Search ........................ 359/4, 7, 300, 559, 359/561; 372/21

[56] References Cited

U.S. PATENT DOCUMENTS

| | | | |
|---|---|---|---|
| 4,576,434 | 3/1986 | Hiugnard et al. | 359/7 |
| 4,674,824 | 6/1987 | Goodman et al. | 359/7 |
| 4,927,220 | 5/1990 | Hesselink et al. | 359/559 |
| 4,948,212 | 8/1990 | Cheng et al. | 359/561 |
| 4,961,615 | 10/1990 | Owechko et al. | 359/561 |
| 5,005,927 | 4/1991 | Cudney et al. | 359/7 |

OTHER PUBLICATIONS

"Real Time Edge Enhancement Using the Photorefractive Effect", Jack Feinberg, *Optics Letters*, Aug. 80, pp. 330-332.
"Real Time Coherent Object Age Reconstruction with $Bi_{12}SiO_{20}$ Crystals", Huignard et al., *Applied Optics*, vol. 17, #17, Sep. 1, 1978.
"Real Time Intensity Inversion Using Two-Wave and Four Wave Mixing in Photofractive $Bi_{12}GeO_{20}$", Ochea et al., *Applied Optics*, vol. 24, #12, Jun. 15, 1985.
"Optimization of an Updatable Optical Image Correlator", Nicholson et al., *Optical Engineering*, May 1987, vol. 26, No. 5.
"Simple Computational Model of Image Correlation by Four-Wave Mixing in Photorefractive Media", Nicholson et al., *Applied Optics*, vol. 26, No. 2, Jan. 15, 1987.
"Fundamental Limit of the Speed of the Photofractive Effect", Yeh, *Applied Optics*, vol. 26, No. 4, 15 Feb. 1987.
"Optical Correlators with Fast Updating Speed Using Photofractive Semiconductor Materials", Gheen et al., *Applied Optics*, vol. 27, No. 13, 1 Jul. 1988.

*Primary Examiner*—Bruce Y. Arnold
*Assistant Examiner*—J. P. Ryan
*Attorney, Agent, or Firm*—Thomas H. Jones; John R. Manning; Guy M. Miller

[57] ABSTRACT

Edge enhancement of an input image by four-wave mixing a first write beam with a second write beam in a photorefractive crystal, e.g., GaAs, achieved for VanderLugt optical correlation with an edge enhanced reference image by optimizing the power ratio of a second write beam to the first write beam, e.g., 70:1, and optimizing the power ratio of a read beam, which carries the reference image to the first write beam, e.g., 100:701. Liquid crystal TV panels are employed as spatial light modulators in order to change the input and reference images in real time.

5 Claims, 3 Drawing Sheets

REAL-TIME EDGE-ENHANCED OPTICAL CORRELATOR

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

This invention relates to optical correlators and more particularly to real-time edge-enhanced optical correlators utilizing the four-wave mixing properties of photorefractive materials.

BACKGROUND ART

The main advantage of optical correlators, as compared with their digital counterparts, is that high-resolution Fourier transform operation on the input optical images may be rapidly executed, typically in nanoseconds by simply transmitting the input image through a single lens. However, the overall speed of an optical correlator is still limited by how fast the information can be updated on the input devices (spatial light modulators), the real-time holographic material, and the output device (camera or detector array). The speeds of these three components are equally important because the slowest component will determine the overall speed of the system.

Gregory Gheen and Li-Jen Cheng have reported using photorefractive GaAs in a paper titled "Optical correlators with fast updating speed using photorefractive semiconductor materials," Applied Optics, Vol. 27, No. 13, pp. 2756-2761, (1988). The objective was to improve the speed of real-time optical correlators. In principle, all nonlinear optical materials can be used as real-time holographic materials. However, although many nonlinear optical materials have very short response times, they require too high an intensity to yield a practical diffraction efficiency.

Photorefractive crystals are in general slower than other nonlinear optical materials, but they can operate with a much lower power requirement. Among all the photorefractive crystals, semiconductors such as GaAs, InP, and CdTe are in general one to two orders of magnitude faster than photorefractive oxides such as $BaTiO_3$, SBN and BSO. They are, therefore, more suitable for real-time applications.

In the GaAs based optical correlator reported by Gregory Gheen and Li-Jen Cheng, the input image and the reference image were put on photographic films only. That does not lend itself to real-time image correlation. What is required is some means, such as a liquid crystal TV panel having a thin-film transistor active matrix of MxN pixels where M and N are integers, to serve the function of spatial light modulators to produce in real time input and reference images. Consequently, an object of this invention is to provide a real-time GaAs-based VanderLugt optical correlator in which real-time input devices, i.e., liquid-crystal TVs (LCTVs), are used. The output device is a vidicon camera. The speeds of both the LCTVs and the vidicon camera are video rate, while that of the GaAs may be much higher (as high as 1000 frames/sec). Therefore, the speed bottleneck of the optical correlator is at both the input and the output devices.

When the shape, size and orientation of the object in the input image and the object in the reference image are the same, the correlator displays a bright spot (autocorrelation peak) in the output image at an equivalent location of the object in the input image. Therefore the autocorrelation peak can be used not only to identify an object but also to track its location. Edge-enhanced input and reference images yield a sharper autocorrelation peak and thus a better defined position of the object in the input image. Nevertheless, the autocorrelation peak intensity of edge enhanced input and reference images is more sensitive to the relative size and orientation of the object in the input image with respect to the object in the reference image.

Edge enhancement of an image can be implemented by using the dependence of the diffraction efficiency (or modulation depth) on the write-beam ratio in four-wave mixing in the photorefractive crystal. J. P. Huignard and J. P. Herriau, "Real-time coherent object edge reconstruction with $Bi_{12}SiO_{20}$ crystals," Appl. Opt., Vol. 17, No. 17, pp. 2671-2672 (1978); J. Feinberg, "Real-time edge enhancement using the photorefractive effect," Opt. Lett., Vol. 5, pp. 330-332 (1980); and E. Ochoa, L. Hesselink and J. W. Goodman, "Real-time intensity inversion using two-wave and four-wave mixing photorefractive $Bi_{12}GeO_{20}$," Appl. Opt., Vol. 24, pp. 1826-1832, (1985). The technique of real-time coherent object edge reconstruction with $Bi_{12}SiO_{20}$ reported by J. P. Huignard and J. P. Herriau can be used to edge-enhance the input image, but it cannot be used to edge-enhance the reference image. Consequently, another object of this invention is to implement edge enhancement on the reference image using the dependence of the index grating erasing, which reduces the diffraction efficiency on the read beam intensity.

STATEMENT OF THE INVENTION

In accordance with the present invention, a laser beam is expanded, collimated and split into three beams, namely write beam 1, write beam 2 and read beam, using polarizing beam splitters and half-wave plates, although a separate laser may be used for the read beam. The half-wave plates are used for adjusting the beam intensity ratios by rotating the polarizations of the laser beams. Separate spatial light modulators, such as liquid crystal TV panels, are placed in the paths of write beam 1 and the read beam in order to introduce an input image and a reference image, respectively. The input and reference images are then Fourier transformed by separate lenses and directed onto opposite faces of a photorefractive crystal, such as a photorefractive compound semiconductor crystal. The write beam 2 is directed onto the same face of the semiconductor materials as the write beam 1 which bears the input image.

A Dove prism is placed in the path of the read beam and caused to spin about the axis of the read beam to rotate the reference image and thereby produce a rotation invariant effect in order to provide for correlation between the reference image and all angles of orientation of the input image. The read beam which bears the reference image is subjected to the Bragg diffraction process as it is transmitted through the semiconductor material and then propagates along the path of write beam 1. In so doing the diffracted beam is reverse Fourier transformed. Orientation of the semiconductor material causes the diffracted beam (s-polarized) to be polarized perpendicular to that of the read beam (p-polarized) so that a polarizing beam splitter in the path of write beam 1 reflects only the diffracted beam into a suitable readout means, such as a TV camera.

The power ratio of write beam 2 to write beam 1 is optimized so that the input image is effectively edge enhanced by the photorefractive crystal using the technique reported by J. P. Huignard and J. P. Herriau in the paper cited above. What is new here is that the power ratio of the read beam to the write beam 1 is optimized so that the object in the reference image is also edge enhanced by the photorefractive crystal in accordance with the present invention.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 4b illustrates in an idealized line drawing the result of cross correlation of the small circular reference image with the large circular input image shown in FIG. 4a.

DETAILED DESCRIPTION OF THE INVENTION

Figure 1:
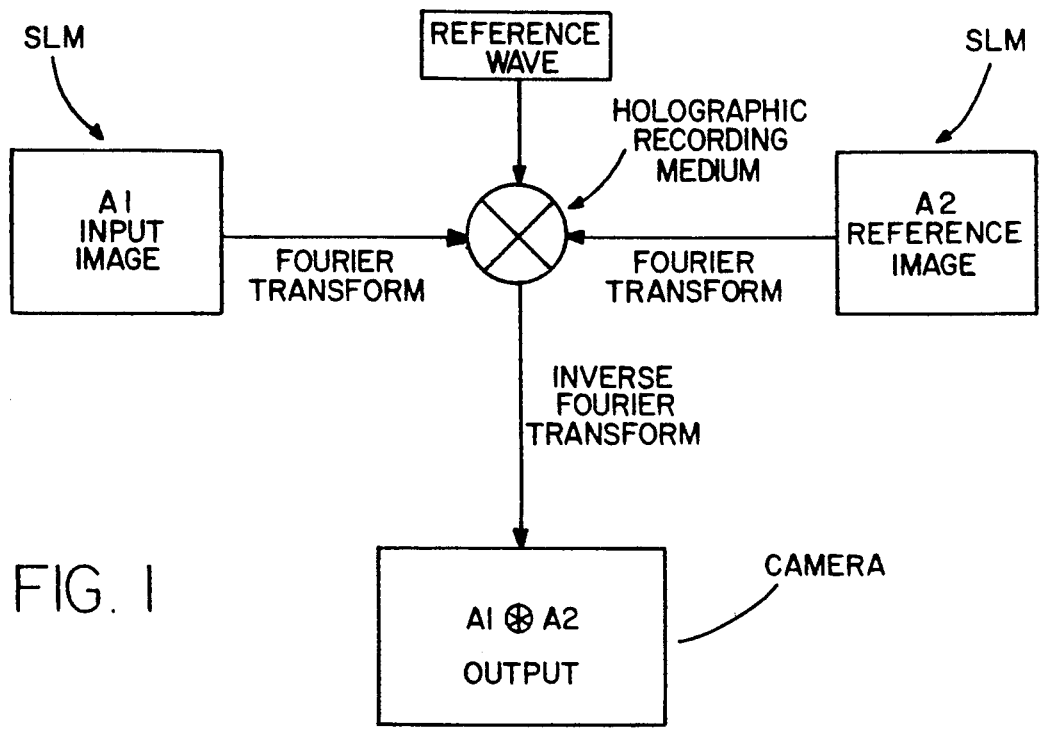
FIG. 1 illustrates a general block diagram of a correlation theorem-based optical correlator.

Referring to FIG. 1, an optical correlator is shown which implements a correlation theorem given by $$A_1 \otimes A_2 = F^{-1}[F(A_1)F^*(A_2)] \quad (1)$$

where $A_1$ and $A_2$ represent two two-dimensional images and $A_1 \otimes A_2$ represent the correlation function of $A_1$ and $A_2$ given by $$A_1 \otimes A_2 = \int_{-\infty}^{\infty} \int A_1(x',y') A_2(x'-x, y'-y) dx' dy' \quad (2)$$

The significance of Equation (1) is that it contains only the Fourier transforms of $A_1$ and $A_2$ which can be easily implemented optically using lenses, while Equation (2) contains a double integral which is not in an explicit form that can be implemented optically. The time needed for a Fourier transform operation is as short as the time needed for light to travel less than twice the focal length of the lens, usually only a few nanoseconds.

Figure 2B:
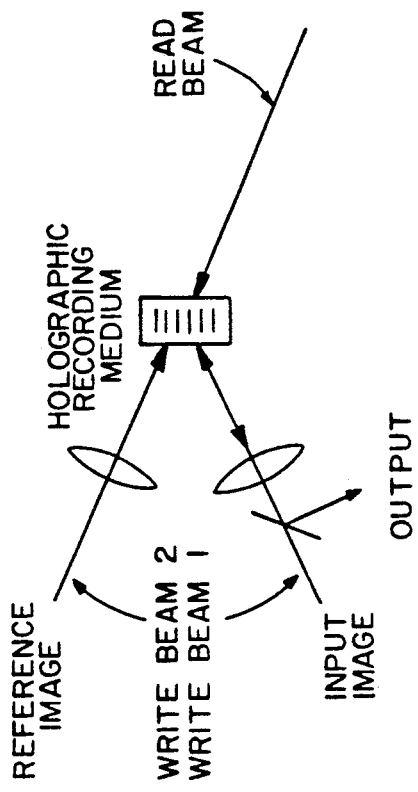
FIGS. 2a and 2b illustrates two configurations of correlation-theorem based optical correlators, namely (a) the VanderLugt configuration and (b) the joint transform configuration, respectively.
Figure 2A:
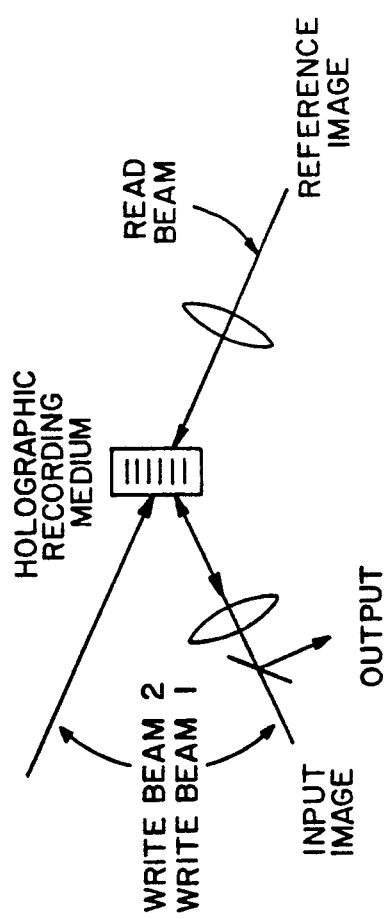

The multiplication operation in the right side of Equation (1) is implemented by holographic writing and reading. The result of multiplication, $F(A_1)F^*(A_2)$, is proportional to the diffracted beam. The inverse Fourier transform of $F(A_1)F^*(A_2)$ can be again performed by a lens. Two optical correlator configurations will now be discussed and compared with reference to FIGS. 2a and 2b.

In a nonreal-time implementation, writing and reading a hologram takes place at different times, whereas in real-time implementation they are required to take place simultaneously. That requires a four-wave mixing process in which the write beam 1, the write beam 2, and the read beam may interact with each other in the holographic medium according to nonlinear coupled wave equations. In general, in a correlation-theorem based optical correlator, there are two methods for writing and reading the holograms using distinct configurations illustrated in FIGS. 2a and 2b, namely (a) the VanderLugt configuration and (b) the joint transform configuration. In the VanderLugt configuration, the hologram is written by the Fourier transform of input image and write beam 2, usually a plane wave, and read by the Fourier transform of reference image, while in the joint transform configuration, the hologram is written by the Fourier transforms of both images and read by a plane wave.

Mathematically, these two configurations are similar, but in real-time implementations there is a difference in the system speed limitations. Namely, in the VanderLugt configuration, the image in the read beam may be changed faster than the speed of the holographic medium because the read beam is not responsible for writing the hologram, whereas in the joint transform configuration, none of the image beams can be changed faster than the speed of the holographic medium, because they need to write the hologram. This difference is important in achieving rotation variance and size invariances as discussed below.

Correlation theorem-based optical correlators are not rotation- and size-invariant, because they only perform template matching. Although rotation invariance and size invariance can be achieved using certain algorithms, these algorithms usually cannot be implemented optically; instead, digital implementation is needed. However, size invariance and rotation invariance can be implemented optically by rotating and varying the size of the reference image continuously. This implementation is not practical unless the reference image can be changed much faster than the input image. Therefore, VanderLugt configuration is more adequate for implementing rotation invariance and size invariance. However, one should note that the frame rate of the system will be decreased if the reference image is rotated on the spatial light modulator electronically. A potential solution to this problem is to rotate the image optomechanically. For example, the image in the optical beam may be rotated by a Dove prism.

The nonlinear optical process involved in the real-time optical correlator is four-wave mixing because there are four beams, i.e., three input beams and one output beam mixed in the nonlinear optical medium. Degenerate four-wave mixing (DFWM) refers here to the four-wave mixing process in which the wavelengths of all the beams are the same, whereas non-DFWM refers to the one in which the wavelengths of the read beam and the write beam are different. (Note that in nonlinear optics, non-DFWM may also refer to the process in which the wavelengths of the two write beams are different.) A fundamental issue that occurs in volume holographic medium based correlator is the view angle limitation imposed by the Bragg diffraction process in which the diffraction angle cannot be arbitrary as in the non-Bragg diffraction process.

The Bragg limitation is different for optical correlators using DFWM and non-DFWM. In DFWM, Bragg diffraction only limits the view angle of the read beam, whereas in non-DFWM it limits the view angles of both the read beam and write beam 1. Thus, for optical correlators using DFWM, it is possible to have a full translation invariance (by putting the input image in write beam 1), whereas for optical correlators using non-DFWM, only partial translation invariance exists.

Bragg diffraction does limit the view angle of the read beam or the write beam 2 in both DFWM and non-DFWM. However, because the position of the reference image can be fixed and centered to the read beam (in the VanderLugt configuration) or to the write beam 2 (in the joint transform configuration), this Bragg limitation usually does not create a problem unless the reference image is too large; even so, the size of the reference image can always be reduced to be within the view angle using a lens imaging system.

Another difference between DFWM and non-DFWM in the photorefractive crystal is the diffraction efficiency. In DFWM, because the wavelength of the read beam is the same as that of the write beam, the hologram will be partially erased and so the diffraction efficiency will be reduced, whereas in non-DFWM the wavelength of the read beam can be chosen such that the photorefractive crystal is not sensitive to that wavelength. Therefore, in general, the diffraction efficiency in non-DFWM is higher than that in DFWM, but because of the advantage of translation invariance discussed above and edge enhancement discussed below, DFWM is selected for the present invention.

Image Edge Enhancement

Edge enhancement is an image processing technique that erases the body (or DC component in the Fourier domain) of an image so that only the edge (or AC component) is kept. Edge-enhanced optical correlation refers to the kind of correlator in which the input image and the reference image are edge-enhanced. The advantage of an edge-enhanced correlator is that the autocorrelation peak of an edge enhanced image is sharper than that of the original image. However, the tradeoff is that the peak intensity is relatively sensitive to angular shifts and size difference between the input image and the reference image. The size sensitivity problem is more difficult to solve than the angular sensitivity problem. Nevertheless, in certain applications, the size of the input image is fixed and always the same as that of the reference image.

The angular sensitivity problem can be solved by rotating the reference image continuously, such as by spinning a Dove prism. Edge enhancement of an image can be implemented holographically by using the dependence of the diffraction efficiency on the writebeam ratio, as in the prior art referred to hereinbefore. However, this prior-art technique can only be used to edge enhance the input image. In accordance with the present invention, the reference image in the read beam can also be edge enhanced in a manner which will now be described in detail. With DFWM in a photorefractive crystal, the index grating can be partially erased by the read beam. The erased amount increases with the read beam power. Note that the beam power equals the beam intensity times the cross-section area of the main laser beam, typically about 1 cm$^2$. Consequently, the beam power ratios for edge enhancement may be adjusted by adjustment of light intensity since the cross sections of both write beams and the read are substantially equal. But to be technically correct, it is the power ratios of the write beams and the read beam that are optimized for input image edge enhancement in the first instance and then output image edge enhancement, although adjustment of intensity is sometimes used hereinafter.

Since in the Fourier domain, the DC component (body of the image) usually has a higher intensity than the AC component (edge of the image), the diffraction efficiency of the DC component is lower than that of the AC component. The intensity ratio of the read beam to the write beams is optimized so that the object in the reference image is effectively edge enhanced by the photorefractive crystal. The required adjustment for this may be determined empirically by placing the same input image in the read beam as placed in write beam 1 and, after adjusting the intensity ratio of the write beam 1 to the write beam 2, adjusting the intensity ratio of the read beam to the write beams until optimum edge enhancement is achieved. Thus, the combination of Fourier lenses and the photorefractive crystal in the present invention functions effectively like a high-pass filter which allows only the edges of the input image and the reference image to pass. This unique and simple process for simultaneous double-edge enhancement in a photorefractive crystal based optical correlator can save the otherwise needed additional computer time for achieving edge enhancement.

Example

Figure 3:
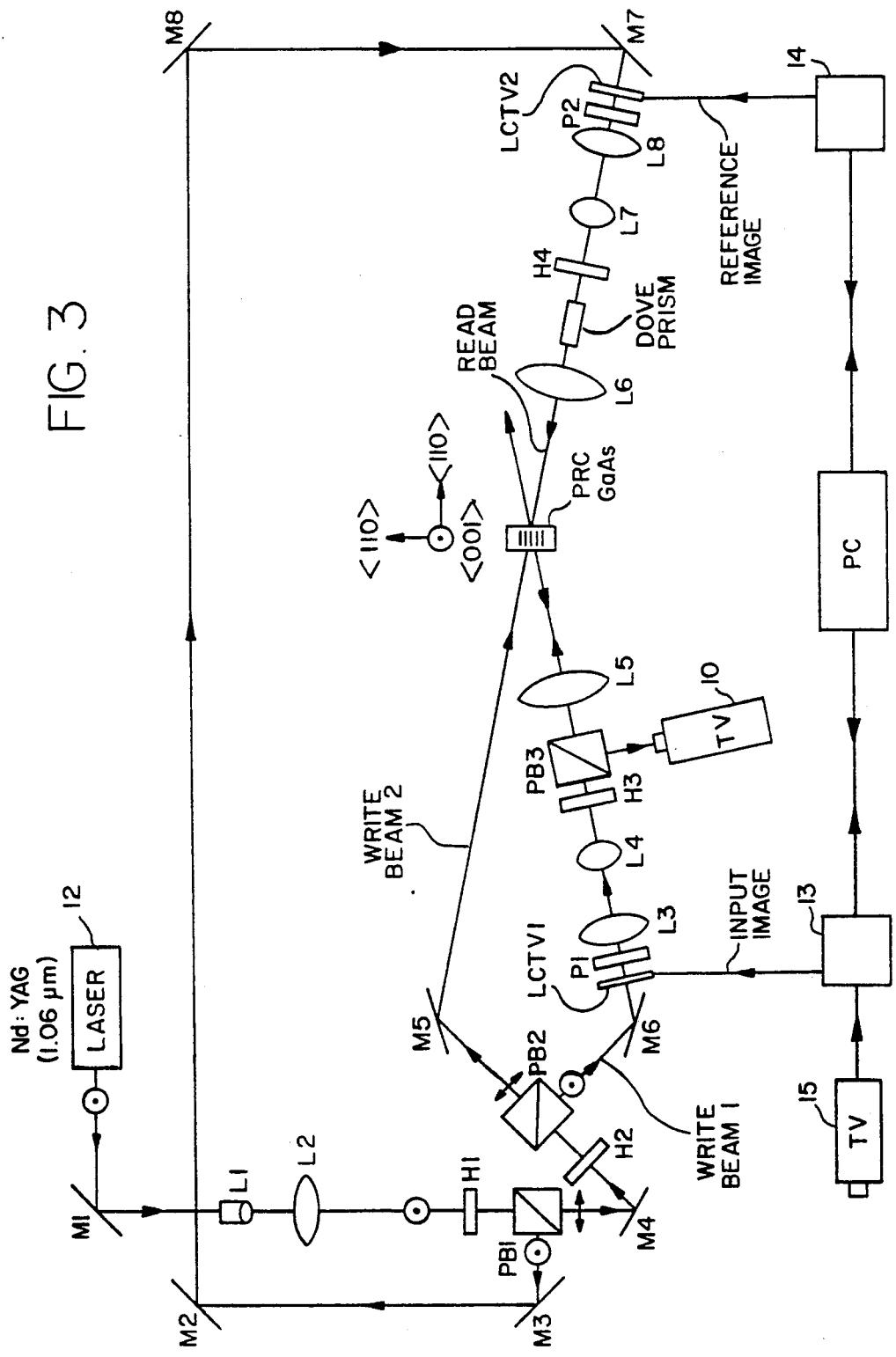
FIG. 3 illustrates schematically an arrangement for a real-time optical correlator utilizing the polarization properties of degenerate four-wave mixing in a photorefractive semiconductor material in accordance with the present invention.

In one example of the present invention illustrated in FIG. 3, GaAs photorefractive crystal PRC is used as the degenerate four-wave mixing (DFWM) material in the VanderLugt (transmission-hologram) configuration, because obtaining a higher speed in the GaAs material and a full translation invariance was desired. The tradeoff in this configuration is a smaller diffraction efficiency. However, the read-out signals obtained were still strong enough to saturate a TV camera 10 (vidicom) or the equivalent (e.g., a Ge detector array). With a diffraction efficiency less than 0.1% (estimated from previous experiments), background noise can be easily stronger than the signal. The only way of obtaining a clean output was to eliminate as much background noise as possible. A high signal-to-noise ratio was achieved by selecting the crystal orientation indicated above the GaAs crystal PRC in FIG. 3. That orientation can yield a cross-polarization readout, and in so doing, the polarization of the diffracted beam was caused to be perpendicular to that of the read beam as well as the background noise as indicated in FIG. 3, so that the noise could be eliminated by a polarizing beam splitter PB3.

The main laser beam 11 from an Na:YAG laser 12 was expanded and collimated by lenses L1 and L2 and then split into three beams, namely WRITE BEAM 1, WRITE BEAM 2, and READ BEAM by polarizing beam splitters PB1 and PB2. Mirrors M1 through M7 are provided as needed to route the split beams onto the photorefractive crystal PRC at the appropriate angles with faces of the crystal, as shown. Half-wave plates H1 and H2 were used in conjunction with the beam splitters PB1 and PB2, respectively, to adjust the beam power (intensity) ratios referred to hereinbefore. Spatial light modulators implemented with liquid crystal TV panels, LCTV1 and LCTV2, were put in the respective paths of the WRITE BEAM 1 and the READ BEAM to introduce the input image and the reference image, respectively, under control of a personal computer PC.

However, since the READ BEAM need not be coherent with WRITE BEAM 1 and WRITE BEAM 2, a separate laser could have been used to generate the READ BEAM directed through the spatial light modulator implemented with the liquid crystal TV panel LCTV2.

As mentioned earlier, the Bragg diffraction process will limit the horizontal size of the reference image modulated in the READ BEAM. To reduce this limitation, the images on the two liquid crystal TV panels are demagnified by lenses L3, L4 and L7, L8, respectively. The images are then Fourier transformed by lenses L5 and L6, respectively. The diffracted beam propagates from the GaAs crystal PRC along the WRITE BEAM 1 and passes through Fourier lens L5 in a direction opposite WRITE BEAM 1. By doing so, the diffracted beam in the path of WRITE BEAM 1 is inverse Fourier transformed.

The orientation of the GaAs crystal PRC is indicated in FIG. 3 directly over the crystal allows cross-polarization readout, i.e., the polarization of the diffracted beam passed through the lens L5 is perpendicular to that of the READ BEAM. As a result, polarizing beam splitter PB3 reflects only the diffracted beam (s-polarized) into the camera 10, because other beams are p-polarized. This not only yields a higher signal-to-noise ratio, but also allows most of the WRITE BEAM 1 to be transmitted through and most of the diffracted beam to be reflected by the polarizing beam splitter PB3.

In order to produce an input image and a reference image in the respective WRITE BEAM 1 and READ BEAM, the personal computer PC was installed with image frame grabbers 13 and 14. In general, an image frame grabber can take real-time video input, freeze one frame and digitize it for storing in a disk in the computer. In reverse, it can convert the digitized image to standard analog video signal for separately driving the liquid crystal TV panels LCTV1 and LCTV2. Using image manipulation software in the computer, it is possible to do many things to the digitized image, such as "cut and paste," move image detail from one area to another, and even create an image from scratch. In the example, the input and reference images were entered through the separate image frame grabbers 13 and 14 synchronized by the personal computer. The reference image was kept fixed in the frame grabber 14 to drive the spatial light modulator panel LCTV2, while the input image entered through the spatial light modulator LCTV1 contained fixed and moving objects at different times. The movement of an input image was simulated by using the moving function of the image manipulation software. It was contemplated that in actual applications, the input image would be from a TV camera 15, hence the need for the frame grabber 13, and the reference image would be from the computer PC installed with the required software for synchronizing operation of the frame grabber 13 with the frame grabber 14, while continually entering input and reference images.

Experiments performed with this arrangement included a successful video demonstration of real-time image correlation, response time measurement, characterization of the spatial light modulator for panels LCTV1 and LCTV2 and edge enhancement. In all the experiments, the diameter of the collimated main laser beam was about 0.4" which covers about ½ of the spatial light modulator panel (1.1"×0.8"). The laser beam was not expanded to cover the full spatial light modulator (liquid crystal TV panel), because a higher intensity at the crystal was desired for yielding a shorter response time. (Note that the response time of a photorefractive crystal is basically inversely proportional to the laser intensity.)

The spatial light modulators LCTV1 and LCTV2 used were obtained from a color projection TV sold by Epson, together with the pixel drive circuitry.

One projection TV contains three spatial light modulator panels (LCTVs) modulating three (red, green, and blue) beams, separately. The device technology of the LCTVs is the thin film transistor (TFT) active matrix which can yield a relatively higher contrast ratio than earlier technology. The resolution of each LCTV is 320×220 and the measured contrast ratio at 1.06 micron was 100:1. Due to the pixel structure of the panel, the transmitted image is diffracted into many orders. The maximum transmittance of an LCTV was experimentally checked at 1.06 micron wavelength and a value of about 8%. The LCTVs were operated at a TV video frame rate which is slower than the frame rate that could be used for correlation of images directed onto the GaAs. That TV frame rate was thus the maximum speed at which the correlator could be operated.

The GaAs sample used was undoped, polished, and antireflection coated. The dimension was 11×10×5 mm. No external electric field was applied to enhance the diffraction efficiency, because the applied electric field would increase the response time of GaAs. The response time of GaAs was measured by a Ge detector with WRITE BEAM 1 being chopped. The rise time of GaAs in the correlator setup was measured as a function of the total laser intensity for READ BEAM: WRITE BEAM 1 : WRITE BEAM 2=100:70:1 (measured before the beams were transmitted through LCTVs). The shortest response time measured was 0.8 msec at a total laser intensity of about 1.5 W/cm$^2$ and a grating spacing of about 6 microns (angle between write beams=11°). In general, at this intensity level an order of magnitude shorter response time should be obtained, but, in practice, the spatial light modulator LCTV1 and LCTV2 could cut down the light intensity and thus the speed significantly. Nevertheless, the experimental data indicate that even at 200 mW/cm$^2$ the response time (10 msec) is still comparable to the video rate.

The maximum total beam power just before the beams entered the crystal was about 100 mW, which was only about 6% of the total laser power. Thus, to reduce the power requirement, it is necessary to find a spatial light modulator that has a higher transmission. Nevertheless, for a frame rate between 100 and 1000 frames/sec using LCTVs, very compact commercial laser-diode pumped single frequency solid state lasers (0.5 W) may satisfy this power requirement.

Note that because the READ BEAM does not have to be coherent with WRITE BEAM 1 and WRITE BEAM 2, two separate lasers can be used as noted hereinbefore, one for the READ BEAM and one for WRITE BEAM 1 and WRITE BEAM 2. Thus, the effective available total laser power of these compact lasers is 1 W. With such lasers, it is possible to build a very compact and fast GaAs based optical correlator.

Figure 4A:
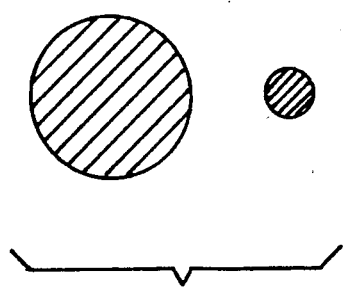
FIGS. 4a and 4b illustrate schematically the experimental result of edge enhancement of the input image and the reference image.
Figure 4B:
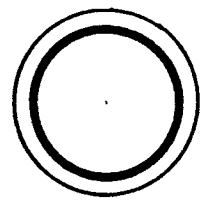

As mentioned earlier, it is possible to perform edge enhancement on both the input image and the reference image in the present invention. In this experiment, two circular images shown in FIG. 4a were used, one a large filled circle and the other a small filled circle. FIG. 4b shows that the correlation pattern between the large filled circle and the small filled circle (dot) is an unfilled circle, i.e., an edge enhanced image. This is true for either when the dot is in the input image via LCTV1 or in the reference image via LCTV2.

The correlation output shown in FIG. 4b actually contains two circles with the inner circle stronger than the outer one. This is because the dot is actually a small filled circle which was also edge enhanced in the wave-mixing process, and that the correlation between a small circle and a big circle is two circles. The difference in radius of the two circles is equal to the diameter of the small filled circle, because in FIG. 4b, the inner circle corresponds to the overlap between the two circles as the small input circle is moving and touching the inside edge of the big input circle, while the outer circle corresponds to the overlap between the two circles as the small reference circle is moving and touching the outside edge of the big input circle. In both cases, there is edge enhancement of the correlation between two circular images, but the inner circle edge enhancement is greater.

As noted hereinbefore, the edge enhancement technique of this invention requires adjustment of not only the power ratio of the WRITE BEAM 1 to the WRITE BEAM 2 but also of the WRITE BEAM 1 to the READ BEAM, and, since the cross sections of the beams are equal, it is possible to adjust power ratios by adjusting intensity ratios. That is done by adjusting the intensity of the WRITE BEAM 1 by providing a polarizer P1 and adjusting the angular orientation of a half-wave plate H3 in its path to adjust the intensity of the WRITE BEAM 1 relative to WRITE BEAM 2. Similarly, by providing a polarizer P2 and a half-wave plate H4 in the path of the READ BEAM, the angular orientation of the half-wave plate H2 is adjusted to adjust the intensity of the READ BEAM relative to the WRITE BEAM 1.

It should be noted that a DOVE PRISM may be placed in the READ BEAM path and caused to spin about the axis of the READ BEAM to rotate the reference image during correlation with an input image. That produces a rotation invariant effect for correlation between the input image and all angles of orientation of the reference image. There would be no advantage in the special case of correlating two circular images, but except for that special case, such a DOVE PRISM should be included.

Although particular embodiments of the invention have been described and illustrated herein, it is recognized that modifications and variations may readily occur to those skilled in the art. Consequently, it is intended that the claims be interpreted to over such modifications and equivalents.

What is claimed is:

1. A real-time edge-enhanced VanderLugt optical correlator utilizing degenerate four-wave mixing properties of a photorefractive crystal comprising means for producing polarized coherent first and second write beams directed onto a first face of said crystal for producing a diffraction grating, means for producing a polarized read beam directed onto a second face of said crystal opposite said first face for Bragg diffraction by said diffraction grating produced by mixing said first and second write beams, whereby a diffracted beam propagates along the path of said first write beam in an opposite direction, separate spatial light modulators in the paths of said first write beam and said read beam in order to introduce in real time an input image and a reference image in said first write beam and said read beam, respectively, separate lenses in the paths of said first write beam and said read beam between said spatial light modulators and said first and second opposing faces of said photorefractive crystal for separate Fourier transformation of said input and reference images, said photorefractive crystal being oriented to cause said diffracted beam to be polarized perpendicular to that of said read beam, a polarizing beam splitter in said path of said first write beam between said spatial light modulator in the path of said first write beam and said lens for Fourier transformation of said first write beam, whereby said diffracted beam is reflected out of said path of said first write beam, means for adjusting the ratio of power of said read beam to said first write beam, with said read beam of sufficient power for optimum edge enhancement of said reference image by four-wave mixing in said photorefractive crystal, and readout means positioned to receive said diffracted beam reflected by said polarizing beam splitter.

2. A real-time edge-enhanced VanderLugt optical correlator as defined in claim 1 including means for adjusting the power ratio of said second write beam to said first write beam for edge enhancement of said input image by four-wave mixing in said photorefractive crystal.

3. A real-time VanderLugt optical correlator as defined in claim 2 including a means placed in the path of said read beam between said spatial light modulator and said photorefractive crystal to cause said reference image to spin about the axis of said read beam, thereby to rotate said reference image in order to produce a rotation invariant effect in said read beam for correlation between said reference image and said input image at all angles of orientation of said input image.

4. A real-time edge-enhanced VanderLugt optical correlator as defined in claim 1 wherein each of said separate spatial light modulators is comprised of a liquid crystal panel having a thin film transistor matrix of MxN pixels, where M and N are integers.

5. A real-time edge-enhanced VanderLugt optical correlator, as defined in claim 1 wherein said photorefractive crystal is comprised of GaAs.

* * * * *